Oct. 26, 1926.
W. E. FOLTZ
1,604,896
EXCAVATING APPARATUS
Filed March 7, 1925   3 Sheets-Sheet 3
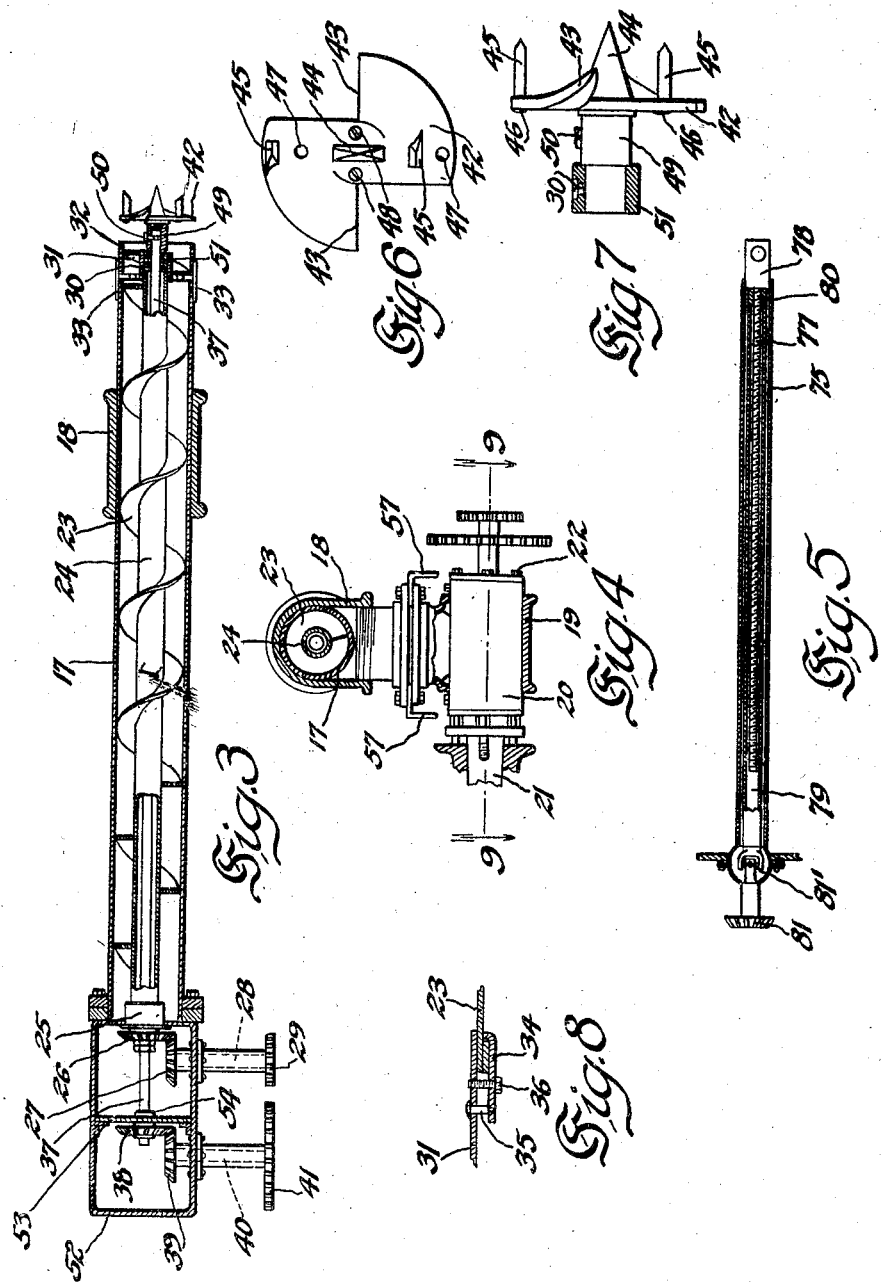
Inventor
William E. Foltz
By his Attorney
G. A. Lovett Patented Oct. 26, 1926.

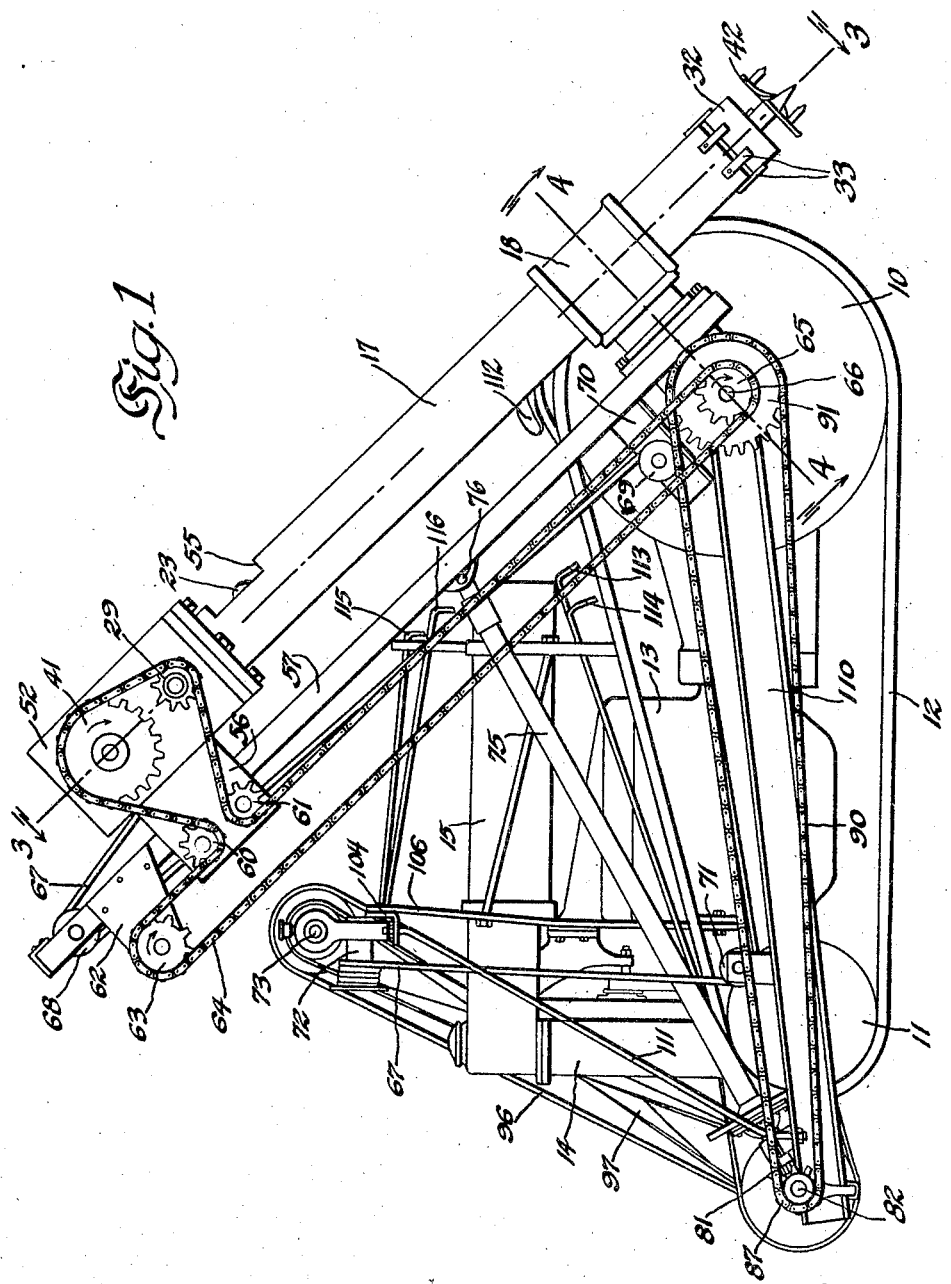

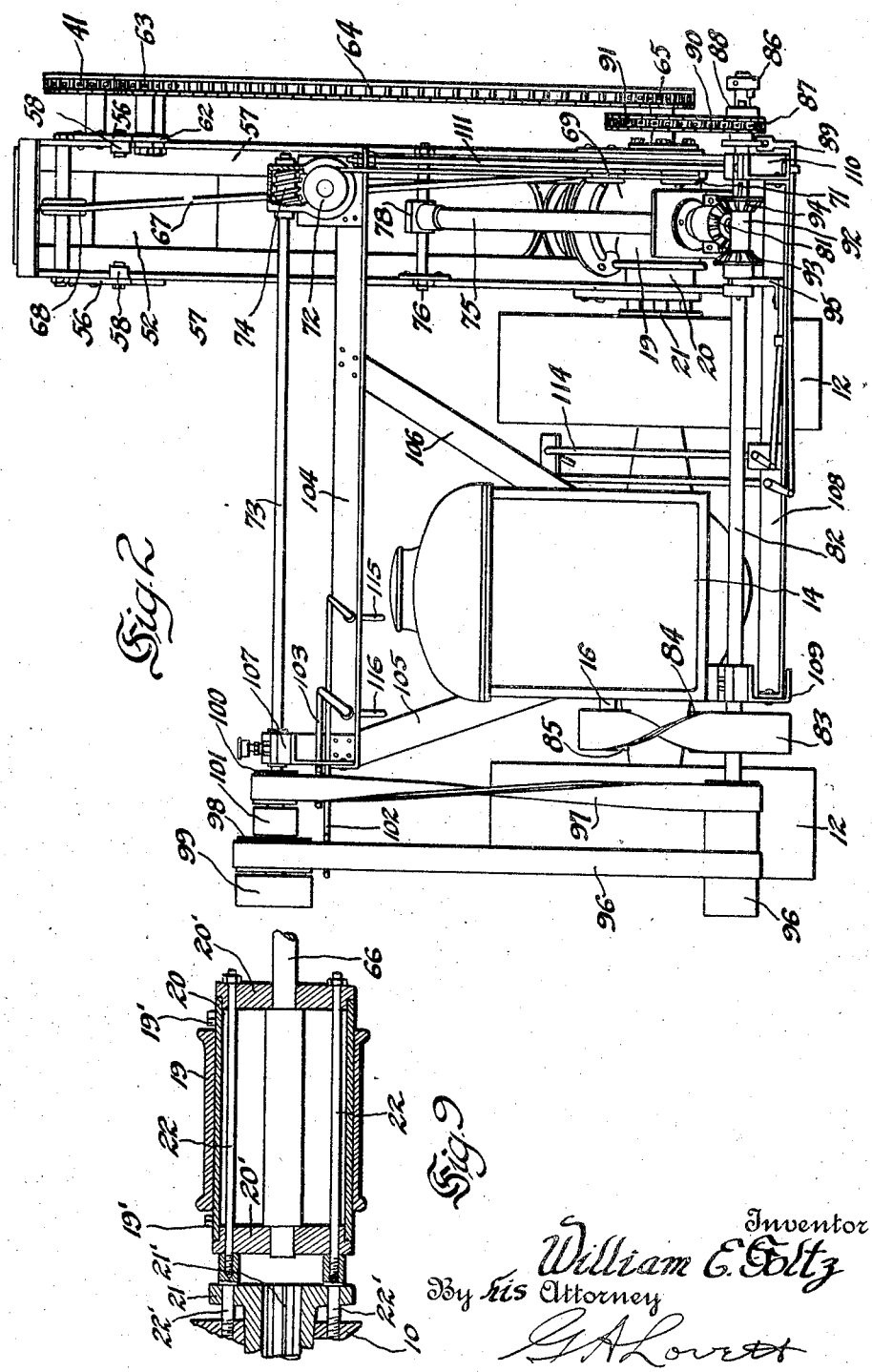

1,604,896

UNITED STATES PATENT OFFICE.

WILLIAM E. FOLTZ, OF DETROIT, MICHIGAN, ASSIGNOR OF ONE-HALF TO GEORGE M. TAYLOR, OF DETROIT, MICHIGAN.

EXCAVATING APPARATUS.

Application filed March 7, 1925. Serial No. 13,677.

The invention relates to excavating apparatus and more especially to machines of the self-contained, power-actuated, portable type. This apparatus is regarded as of general applicability for the removal of earth or other material from locations below the position of the machine but is of especial utility in boring holes, such as post holes, holes for telegraph or telephone poles, land anchors, foundation piers, etc.

The principal object of the invention is to provide a machine of the type mentioned in which the excavating or earth-boring mechanism is combined with and carried upon a tractor, whereby the mechanism may be transported from place to place and the moving parts may be driven preferably from the power plant of the tractor.

Further objects and advantages will appear from the following description taken in connection with the accompanying drawings in which—

Fig. 1 is a side elevation of a machine embodying one form of the invention;

Fig. 2 is a front elevation of the same machine;

Fig. 3 is a section on line 3—3 of Fig. 1;

Fig. 4 is a section on line 4—4 of Fig. 1;

Fig. 5 is a view partly in section showing details of an elevating or tilting mechanism;

Fig. 6 is a bottom plan view and Fig. 7 an elevation of a boring tool forming part of the boring mechanism;

Fig. 8 is a detail view showing in section the connection of a lifting blade to the conveyer; and Fig. 9 is an enlarged section on line 9—9 of Fig. 4.

Referring to the drawings, Figs. 1 and 2 show in a conventional manner a tractor which comprises rear wheels 10, front wheels 11, and ground-engaging elements 12 of the flexible track or belt type. The tractor also includes an engine 13, radiator 14, tank 15 and power take-off or pulley shaft 16. The pulley shaft is arranged to be driven in any usual or convenient manner from the engine of the tractor, such shafts being usually provided in connection with general service tractors for use in driving other machines. The tractor parts as shown, while they represent a well-known form of light tractor, are to a certain extent merely illustrative of the applicability of the excavating mechanism to a conventional tractor, since it will be understood that many features of the invention are not limited to use with any particular make or design of tractor.

The excavating mechanism proper includes a section of tubing 17 of a diameter suitable for the removal of the excavated material. In machines designed for boring holes of relatively small diameter the tube may be, as shown, of only slightly smaller diameter than that of the hole to be excavated. This tube is slidably mounted in a guide 18 which is rigidly secured to a sleeve 19. (See Fig. 4.) The sleeve 19 is pivotally supported upon a tubular member 20 which is rigidly connected to and supported by the rear axle structure of the tractor. As one mode of effecting such connection I have shown the member 20 as being secured to the locking collar or bushing 21 which serves to retain the rear tractor wheel on the axle 21'. The securing means may include bolts 22 which may be substituted for, but are shown as extensions of, the bolts 22' ordinarily employed for securing the locking collar to the wheel hub. (See Fig. 9.) The tubular support 20 is provided with end heads 20' through which the bolts 22 extend. Any suitable detachable or adjustable means, represented by the stops 19', may be employed to determine the position of sleeve 19 on support 20, and a certain degree of adjustability laterally of the tractor may thus be provided. It will be seen that the supporting means described permits the tube 17 to tilt or swing about the axis of the rear tractor wheel and to slide toward and from the ground surface in any position of tilting adjustment.

Within the tube 17 is a conveyer comprising the spiral blade 23 secured at its inner edge to the tubular shaft 24. The shaft is supported at its upper end in a bearing 25 and has fixed thereto a beveled gear 26. This gear is arranged to mesh with another beveled gear 27 on one end of the shaft 28 at the other end of which is a sprocket 29. At the lower end of the shaft 24 is fixed a collar 30 to which is secured a short spiral blade 31 preferably of heavier material than the blade 23. To the outer edge of the blade 31 is secured a cylindrical shell or band 32 which may be of substantially the same diameter as the tube 17 at its lower end. This band is spaced slightly from the tube 17 and is centered relatively to the tube, while being permitted to rotate by means fixed at the lower end of the tube, as, for example, lugs or fingers 33, which extend over the band in contact with its outer surface.

The conveyer section 31 may be secured at its upper end to the lower end of blade or spiral 23 in any suitable manner which provides a rigid connection and permits the earth to be delivered from the lower section. As shown in Fig. 8, which represents a section parallel to the shaft 24, the upper end of section 31 rests upon the lower end of section 23 and is clamped thereto by a plate 34 engaging at one end the lower face of section 23 and at the other end supported upon studs 35, a clamping screw or screws 36 serving to secure the parts firmly together.

Within the tubular shaft 24 is a shaft 37 which at its upper end extends beyond the shaft 24 and carries a beveled gear 38 meshing with a beveled gear 39 on shaft 40. A sprocket 41 is mounted at the outer end of shaft 40 in the same plane with gear 29. The lower end of shaft 37 extends beyond the lower end of collar 30 and carries a boring tool. This tool comprises a plate 42 cut away on opposite sides as shown in plan in Fig. 6. The edges of the plate are bent downwardly, as at 43, to provide cutting edges similar to those of an auger. A central bit 44 and two or more scarifiers 45 are fixed upon the lower side of the plate to loosen stones or the like and to assist in pulverizing hard or frozen soil. The scarifiers are preferably removably attached to the plate 42, as by screws 46, and a plurality of apertures 47 are provided in the plate so that the scarifiers may be applied, in number, arrangement and shape, to suit the character of the soil, also so that they may be spaced at different distances from the axis in order to properly dig up the soil.

To the plate 42 is secured, as by screws 48, a tubular hub 49 adapted to receive the lower end of shaft 37, and the hub is suitably fixed to the shaft, as by screw 50. The upper end of the hub carries a bushing 51 adapted to fit within the collar 30. The boring tool and the shaft 37 are therefore rotatably supported within the collar 30 which, in turn, is aligned with the tube 17 by engagement of the band 32 with the bearing lugs 33.

It will be noted that the plate 42 of the boring tool is spaced a short distance, which may in practice be approximately two inches, below the receiving edge of the lower section 31 of the spiral conveyer. This permits small stones or fragments of bricks or the like to be delivered to the conveyer without difficulty since they will ride up on top of the loose soil until in position to be picked up by the conveyer. Furthermore, the soil carried up on the boring tool will already be in motion in the direction of travel of the conveyer and hence the latter is not required to pick up the borings from a position of rest.

In the form illustrated the tube 17 is attached at its upper end to a casing 52 which encloses the gears for driving the shafts 24 and 37. The lower wall of the casing also supports the bearing 25 and an intermediate wall 53 carries a thrust bearing 54 for the shaft 37. An opening 55, (Fig. 1), is provided in the tube 17 just below the casing 52 through which the conveyer 23 delivers the borings when the machine is in operation.

The casing 52 is supported and guided by means of side plates 56 secured thereto and positioned one on each side of a pair of uprights 57 which may be of angle iron. Rollers 58 on the side plates engage with the uprights to guide the boring mechanism in its movements toward and from the ground surface. The uprights 57 are rigidly connected at their lower ends to the collar 18 and sleeve 19 and therefore swing with the boring mechanism about the axis of the rear wheel of the tractor.

Mounted upon the outer side plate 56, (Fig. 1), are two idler sprockets 60, 61. Upon a bracket 62, secured to the uprights 57, is mounted a third idler 63. A sprocket chain 64, driven by a sprocket 65 mounted coaxially with the pivot of the boring mechanism, as upon the gudgeon 66 carried by the heads 20', (Fig. 9), passes successively over idler 61, sprockets 29 and 41 and idlers 60, 63. The direction of rotation of the driving sprockets 65 is preferably as shown by the arrow thereon so that the force applied thereby will tend to pull downwardly the tube 17 and the parts moving therewith.

It will be seen that the belt or chain 64 will cause rotation of wheels 29 and 41 in the same direction and thereby cause rotation of the boring tool and of the conveyer in the same direction. Sprocket 29 is illustrated as smaller than sprocket 41 in which case the boring tool will be driven at a lower speed than that necessary for the conveyer. It will be understood, however, that the relative directions of rotation of the boring tool and conveyer as well as the proportionate speeds thereof may be varied as circumstances require. If desired, the tube 17 itself may be rotatable in which case the lower end thereof may carry the boring tool or may be formed to constitute a boring tool.

The lifting of the boring mechanism is effected and the lowering movement may be regulated by a cable 67 secured at one end to the casing 52. It passes thence over a guide pulley 68 mounted on the upper end of the uprights 57 and over a guide pulley 69 supported by a bracket 70 adjacent to the lower end of the uprights. Thence it leads over a third guide pulley 71, fixed to the machine frame, and to a drum 72 capable of being rotated in either direction. As a driving means for the drum I have shown a shaft 73 adapted to actuate the drum through suitable gearing, as screw gearing 74.

The tilting of the boring mechanism about the axis of sleeve 19 in order to permit the mechanism to be lowered to the position shown in Fig. 1 for transportation or to be set at any desired inclination at which it may be desired to bore holes may be accomplished by a screw hoist mechanism including an outer tube 75. This tube is pivotally attached at the upper end to the uprights 57, as at 76. Centrally within the tube 75 is a screw 77, fixed to the block 78 which closes and supports the upper end of the tube. A tubular shaft 79 surrounds the screw 77 and carries at its upper end a nut 80 engaging with the screw. The tubular shaft may be driven by a beveled gear 81 connected to the lower end thereof by a universal joint 81′. It will be seen that rotation of the shaft 79 will cause travel of nut 80 on screw 77 and thereby cause tilting movement of the boring mechanism.

The boring and conveyer actuating mechanism, the raising and lowering mechanism and the tilting mechanism have been arranged to be driven by the engine of the tractor itself, although independent sources of power for some or all of these parts may be provided in some cases. The driving mechanism here shown includes a main drive shaft 82 driven by a belt 83 passing over pulleys 84, 85, fixed respectively to the shaft 82 and the power take-off shaft 16 of the tractor. One end of shaft 82 extends beyond the side of the tractor on which the boring mechanism is mounted and has fixed thereto a clutch member 86. A sprocket wheel 87 is mounted slidably and rotatably on the shaft 82 and is provided with a clutch member 88 engageable with the clutch member 86. A suitable shifting member 89 is arranged to move the pulley 87 and its clutch member 88 on the shaft to bring the clutch members into engagement. A sprocket chain 90 connects pulley 87 to a pulley 91 which is fixed to pulley 65. When shaft 82 is actuated, therefore, and clutch members 86, 88, are placed in engagement, motion will be transmitted through pulley 87, chain 90, pulleys 91, 65, and chain 64 to the gears which drive the boring shaft and conveyer.

On shaft 82 is also mounted a sleeve 92 carrying two opposed beveled gears 93, 94. The sleeve is keyed to the shaft to rotate therewith but is slidable longitudinally of the shaft and a shifting fork 95 is arranged to shift the sleeve and gears at will. The gears are so positioned and spaced from each other that either gear may be brought into engagement with gear 81 or that both gears may be freed from gear 81. When it is desired to tilt the boring mechanism the appropriate gear on sleeve 92 may be brought into mesh with gear 81, thereby adjusting the frame of the boring mechanism to the desired position.

A pulley 96 also fixed upon shaft 82 is arranged to drive belts 96, 97. The belt 96 is a straight belt and may be engaged with either of the fast and loose pulleys 98, 99, mounted upon the shaft 73. The belt 97 is a crossed belt and may similarly engage either of the fast and loose pulleys 100, 101, on shaft 73. Suitable shifting forks 102, 103, are provided to shift the belts 96, 97, respectively. Thus it will be seen that by properly positioning the belts 96, 97, the drum 72 may be actuated to hoist or to lower the tube 17 and parts movable therewith. It will be understood that, if desired, the cable 67 could be replaced by a cable having both ends connected to the sliding frame of the boring mechanism and arranged to be actuated in either direction by the drum 72 so that power could be applied to force the boring tool downwardly.

Suitable frame elements are provided for supporting the power transmitting parts upon the tractor frame. These may comprise a transverse bar 104, supported adjacent to the front of the tractor by struts 105, 106, secured at their lower ends to the tractor frame. The bar 104 carries at one end the drum 72 and its driving mechanism and at the other end the bearings 107 for the shaft 73. A second transverse bar 108 at the front of the tractor is supported at one end by connection at 109 to the tractor frame and at the other end by connection to a bar 110. This latter bar extends along the side of the tractor to the support for the boring mechanism thereby serving to space properly the shaft 82 from the axis of the pulleys 91, 65. The forward end of the bar or beam 110 is supported in any suitable manner, as by a rod 111 connected at its upper end to the bar 104.

In some installations, particularly in machines designed for boring relatively small holes, such as post holes, it may be desirable to extend the devices whereby the several power transmitting connections are controlled to points convenient for access by the operator occupying the tractor seat 112. For this purpose I have shown the shifting devices 89, 95, 102, 103 as connected respectively to hand levers 113, 114, 115, 116, arranged within reach of the driver. Thus the driver may proceed with the excavation of a series of holes without being required to leave the tractor seat.

In the position illustrated in Fig. 1 it will be understood that the machine is ready for transportation, the boring mechanism being raised from the ground and being supported in an inclined position, although, in moving short distances, as from one post hole to another, the boring mechanism will ordinarily be left in upright position. Having arrived at the place where a hole is to be bored and the boring tool being suitably positioned, by manipulation of the tractor, over the location of the hole, the tube may be placed at the proper inclination by the tilting mechanism. This inclination may vary relatively to the tractor itself either because of the desire to bore holes inclined to the vertical or because the tractor is standing on an inclined surface. The proper inclination having been obtained, the boring mechanism may be lowered and the boring tool and conveyer set in operation. Boring then proceeds until the desired depth is reached after which the mechanism is hoisted and the procedure is repeated.

It will be noted that the weight of the excavating mechanism is carried chiefly upon an extension outwardly from the axle structure of the tractor wheel. Hence the added weight is supported directly by the tractor wheel without subjecting the frame parts of the tractor to any material strain. Thus I avoid overtaxing the strength of other parts of the tractor which are not designed to sustain abnormal loads.

The frame parts are all preferably detachably secured to the tractor so that, when desired, the excavating mechanism may be removed and the tractor be employed for other uses. The excavating machine may therefore be constructed as an attachment for general service tractors in cases where the owner does not have sufficient demand for the excavator to justify the purchase of a machine in which the excavator is a permanent part of the machine. The details of the machine, therefore, and especially of the supporting parts will vary with the character of the tractor to which the machine is to be adapted.

Many other changes may be made in details of construction by one skilled in the art without departing from the principles and scope of the invention and therefore I do not wish to be restricted to the specific details herein described except as required by the language of the appended claims in view of the prior art.

I claim—

1. In earth boring apparatus, the combination with a supporting frame of a frame carrying the boring mechanism, said latter frame tiltable about a horizontal axis, and means for tilting said frame comprising a tubular strut pivotally connected to said frame, a screw fixed to said strut and housed therein, a rotatable nut engaging said screw and means for rotating said nut.

2. In earth boring apparatus, a boring mechanism adapted to travel toward and from the ground surface, a relatively fixed frame, power means thereon for actuating said boring mechanism, and driving connections between said power means and said boring mechanism comprising driving pulleys on said frame, driven pulleys travelling with said boring mechanism, and flexible power-transmitting means engaging said driving and driven pulleys.

3. In earth boring apparatus, a boring mechanism comprising a tube movable longitudinal toward and from the ground surface, a rotary boring tool at the lower end of the tube, a spiral conveyer within the tube, driving pulleys arranged to travel with the tube for rotating said conveyer and boring tool, and flexible power-transmitting means operative to actuate said pulleys.

4. Structure as in claim 3, the flexible power-transmitting means being driven in a direction to exert a downward pull upon said tube.

5. In earth boring apparatus, a boring mechanism including a boring tool and adapted to travel toward and from the ground surface, a relatively fixed frame, pulleys mounted thereon, a pulley carried on said boring mechanism arranged to drive said tool and positioned intermediate of the pulleys on the frame, and a flexible power-transmitting element engaging all of said pulleys and arranged to be driven by one of the pulleys on the frame and to drive the pulley on the boring mechanism.

6. Excavating mechanism comprising a tube, a spiral conveyer within said tube, a boring tool supported below said tube, and centering means for the lower end of said conveyer comprising a cylindrical member of substantially the same diameter as said tube and constituting an extension thereof and bearing means for said member carried by the tube.

7. Excavating mechanism comprising a tube movable into and from a bore hole, a rotary boring tool at the lower end of the tube, a spiral conveyer within the tube, a shaft for driving said tool supported axially of the conveyer, and a bearing for the lower end of the conveyer comprising a bearing member rotating with the conveyer and means fixed adjacent to the periphery of the tube engaging said rotating member to prevent its lateral displacement.

8. The combination with a tractor having an axle of a boring mechanism supported upon said tractor so as to tilt about the axis of said axle, driving and driven wheels mounted coaxially with said axle, driving means for said boring mechanism actuated by said driven wheel, and means actuated by the power plant of the tractor for actuating said driving wheel.

9. The combination with a tractor having a power plant, ground wheels arranged to be driven thereby and a power take-off shaft adapted to drive other mechanism from said power plant, of a boring mechanism supported upon an extension of the axle of said ground wheels and tiltable thereabout, gearing and control devices therefor, said gearing arranged to actuate said boring mechanism and to be actuated by said power take-off shaft, and supports for said gearing and control devices attachable to and removable from said tractor without modification of the tractor structure.

10. In earth-boring apparatus, the combination with a tractor having a ground wheel and a power take-off shaft and a power plant including means for driving the ground wheel and the power take-off shaft, of a boring mechanism comprising a frame supported upon the tractor to tilt about the axis of said wheel, a boring tool supported upon said frame, and means driven by said power take-off shaft for actuating said tool.

11. The combination with a tractor having a rear axle, ground wheels thereon, an engine and transmission for actuating said wheels, a casing enclosing said engine and transmission and constituting a frame for said tractor, and a power take-off shaft arranged to be actuated by said transmission and extending from said casing, of excavating mechanism constituting an attachment for said tractor and comprising frame members attachable to said tractor frame, boring mechanism carried by said frame members and tiltable about the axis of said rear axle, gearing for actuating said boring mechanism, and driving connections for actuating said gearing from said power take-off shaft.

12. Structure as set forth in claim 11, said boring mechanism including a support tiltable about the axis of the rear axle and movable toward and from the ground surface, and means actuated by said power take-off shaft for tilting said support and moving the same toward and from the ground surface.

13. The combination with a tractor having a ground wheel of a bearing member attachable to the said wheel and extending axially outward to the side of the tractor, and excavating mechanism comprising a boring tool, means for actuating said tool, and a support for said tool and actuating means, said support mounted upon said member and tiltable about the axis of said wheel.

14. In a tractor, a ground wheel, a driving axle therefor, a collar positioned in part within the wheel hub and upon the said axle and providing a means for securing the wheel to the axle, means for securing said collar to said hub, a bearing member also secured to said collar by said securing means, and mechanism mounted upon said bearing member.

15. The combination with a tractor having a rear axle, ground wheels thereon, an engine and transmission for actuating said wheels, a casing enclosing said engine and transmission and constituting a frame for said tractor, and a power take-off shaft extending from said casing and arranged to be driven by said transmission, of excavating mechanism comprising an excavator frame, boring mechanism and gearing for actuating the same mounted upon said excavator frame, and means for securing said excavator frame to said tractor frame and to one of said ground wheels in position to permit actuation of said excavator gearing from said power take-off shaft, said excavating mechanism constituting an attachment securable to and removable from said tractor as a unit.

16. The combination with a tractor having a rear axle, ground wheels thereon, an engine and transmission for actuating said wheels, a casing enclosing said engine and transmission and constituting a frame for said tractor, and a power take-off shaft arranged to be driven by said transmission, of excavating mechanism comprising boring mechanism attached to the outer side of one of the wheels of said tractor, gearing for actuating said boring mechanism, a frame for said gearing, and means for attaching said last-mentioned frame to said tractor frame in position to permit actuation of said gearing from said power take-off shaft.

In testimony whereof I affix my signature.

WILLIAM E. FOLTZ.